United States Patent
Saito et al.

(10) Patent No.: US 9,605,974 B2
(45) Date of Patent: Mar. 28, 2017

(54) ROTATION ANGLE DETECTING DEVICE

(71) Applicant: JTEKT CORPORATION, Osaka-shi, Osaka (JP)

(72) Inventors: So Saito, Kashiwara (JP); Yuji Kariatsumari, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 278 days.

(21) Appl. No.: 14/479,939

(22) Filed: Sep. 8, 2014

(65) Prior Publication Data
US 2015/0077093 A1    Mar. 19, 2015

(30) Foreign Application Priority Data
Sep. 18, 2013  (JP) ................. 2013-192761

(51) Int. Cl.
    *G01B 7/30*     (2006.01)
    *G01D 18/00*     (2006.01)
    *G01D 5/12*     (2006.01)
    *G01D 5/244*     (2006.01)

(52) U.S. Cl.
CPC .......... *G01D 5/12* (2013.01); *G01D 5/24461* (2013.01); *G01D 5/24466* (2013.01)

(58) Field of Classification Search
CPC  G01D 5/12; G01D 5/14; G01D 5/142; G01D 5/145; G01D 5/244; G01D 5/24457; G01D 5/24461; G01D 5/24466; G01D 5/24471; G01D 5/24476; G01D 5/24485; G01R 33/02; G01R 33/06; G01R 33/07; G01R 33/09; H02P 6/16; G01B 7/30
See application file for complete search history.

(56) References Cited

U.S. PATENT DOCUMENTS

| | | | |
|---|---|---|---|
| 2005/0046418 A1* | 3/2005 | Fukaya | G01D 5/145 324/207.25 |
| 2007/0090831 A1 | 4/2007 | Matsumoto et al. | |
| 2007/0291424 A1 | 12/2007 | Nishimoto et al. | |

(Continued)

FOREIGN PATENT DOCUMENTS

| | | |
|---|---|---|
| DE | 10 2004 002 629 A1 | 8/2005 |
| JP | A-2007-322197 | 12/2007 |

(Continued)

OTHER PUBLICATIONS

Apr. 20, 2015 Extended European Search Report issued in European Patent Application No. 14184903.4.

*Primary Examiner* — Huy Q Phan
*Assistant Examiner* — David Frederiksen
(74) *Attorney, Agent, or Firm* — Oliff PLC (57) ABSTRACT

In a rotation angle detecting device, a first magnetic sensor and a second magnetic sensor are disposed at an interval of an electrical angle of 120 degrees around a rotation center axis of a rotor. An output signal of the first magnetic sensor is expressed by $V_1 = \sin \theta$, and an output signal of the second magnetic sensor is expressed by $V_2 = \sin(\theta + 120)$. A determination device determines whether both the magnetic sensors are normal, or there is a failure in at least one of the magnetic sensors, based on whether an expression of $L \leq V_1^2 + V_2^2 + V_1 \cdot V_2 - 0.75 \leq U$ is satisfied, where L is a lower limit and U is an upper limit.

7 Claims, 6 Drawing Sheets

(56) References Cited

U.S. PATENT DOCUMENTS

| | | | | |
|---|---|---|---|---|
| 2008/0054886 A1* | 3/2008 | Uemura | ............... | G01D 5/145 |
| | | | | 324/207.2 |
| 2009/0267594 A1* | 10/2009 | Kather | ............... | G01B 7/30 |
| | | | | 324/207.25 |
| 2011/0043197 A1* | 2/2011 | Trontelj | ............... | G01D 5/145 |
| | | | | 324/207.25 |
| 2012/0227514 A1* | 9/2012 | Ueda | ............... | G01D 5/2457 |
| | | | | 73/862.325 |
| 2012/0229126 A1* | 9/2012 | Maeda | ............... | G01D 5/24485 |
| | | | | 324/207.25 |
| 2013/0187586 A1* | 7/2013 | Murray, III | ............... | H02K 1/148 |
| | | | | 318/400.37 |
| 2014/0210390 A1* | 7/2014 | Huang | ............... | H02P 6/165 |
| | | | | 318/400.04 |

FOREIGN PATENT DOCUMENTS

| | | |
|---|---|---|
| JP | A-2010-101746 | 5/2010 |
| JP | A-2013-61346 | 4/2013 |

\* cited by examiner

ROTATION ANGLE DETECTING DEVICE

INCORPORATION BY REFERENCE

The disclosure of Japanese Patent Application No. 2013-192761 filed on Sep. 18, 2013 including the specification, drawings and abstract is incorporated herein by reference in its entirety.

BACKGROUND OF THE INVENTION

1. Field of the Invention

The present invention relates to a rotation angle detecting device that detects a rotation angle of a rotating body.

2. Description of Related Art

Figure 5:
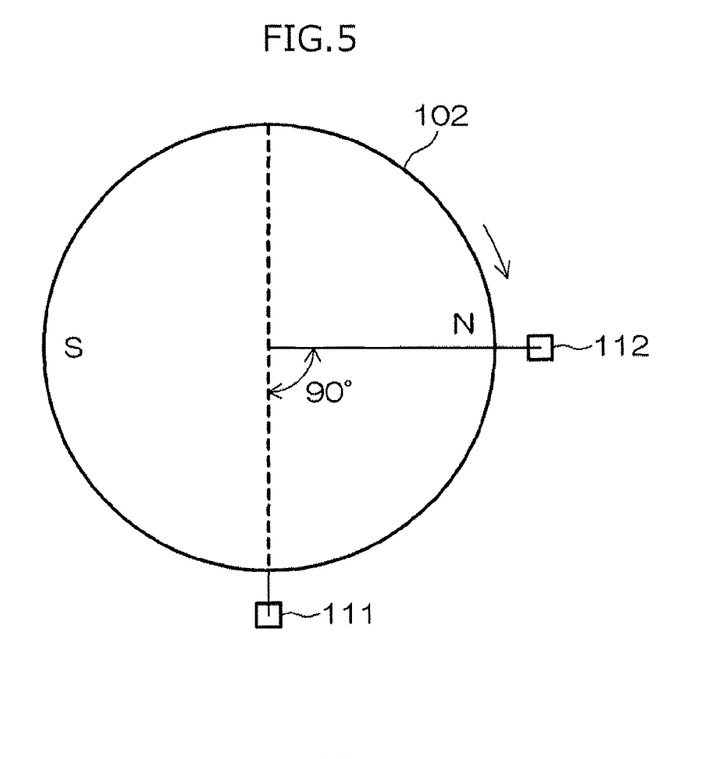
FIG. 5 is a schematic diagram for explaining a rotation angle computation method employed in a rotation angle detecting device in related art.

Brushless motors used in an electric power steering system and the like are controlled by supplying a current to a stator winding in accordance with a rotation angle of a rotor. In order to detect the rotation angle of the rotor, for example, a rotation angle detecting device shown in FIG. 5 is known. The rotation angle detecting device includes a rotor 102 including a magnet having two magnetic poles N, S, and two magnetic sensors 111, 112 that are disposed at an interval of an electrical angle of 90 degrees around a rotation center axis of the rotor 102. The magnetic sensors 111, 112 output their respective sinusoidal signals having a phase difference of 90 degrees therebetween. The rotation angle detecting device detects a rotation angle of the rotor 102 on the basis of the two sinusoidal signals.

Figure 6:
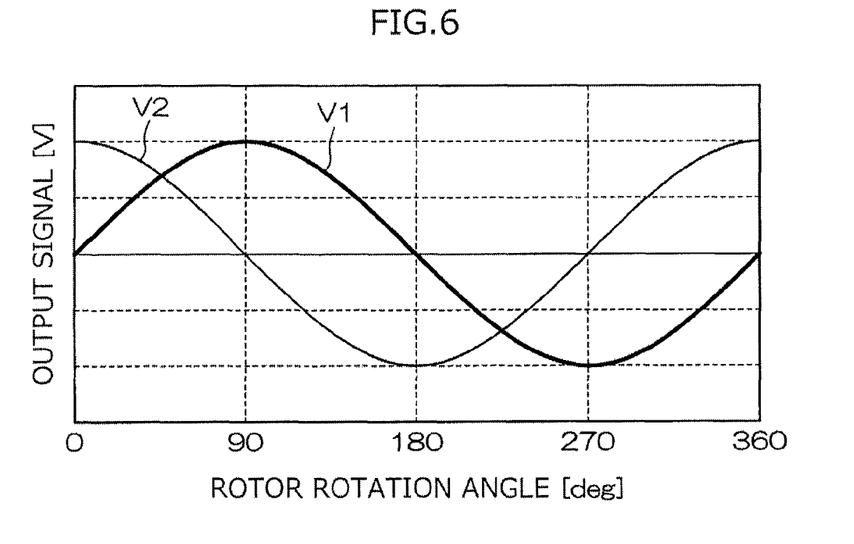
FIG. 6 is a schematic diagram illustrating waveforms of output signals of a first magnetic sensor and a second magnetic sensor.

A direction indicated by an arrow shown in FIG. 5 is a forward rotation direction of the rotor 102. When the rotor 102 rotates in the forward direction, the rotation angle of the rotor 102 increases. When the rotor 102 rotates in a reverse direction, the rotation angle of the rotor 102 decreases. As shown in FIG. 6, sinusoidal signals having a phase difference of 90 degrees therebetween are output from the magnetic sensors 111, 112, respectively. When an output signal $V_1$ ($V_1 = \phi 1 \cdot \sin \theta$) is output from one magnetic sensor 111 with respect to a rotation angle θ of the rotor 102, an output signal $V_2$ ($V_2 = \phi 2 \cdot \sin(\theta+90) = \phi 2 \cdot \cos \theta$) is output from the other magnetic sensor 112. Here, each of φ1 and φ2 denotes an amplitude.

When the amplitudes (φ1, φ2) are regarded as the same value φ or when the signals $V_1$, $V_2$ are normalized so that each of the amplitudes is a predetermined specified value φ, the one output signal $V_1$ is expressed by $V_1 = \phi \cdot \sin \theta$ and the other output signal $V_2$ is expressed by $V_2 = \phi \cdot \cos \theta$. Further, when φ is 1 (φ=1), the one output signal $V_1$ is expressed by $V_1 = \sin \theta$, and the other output signal $V_2$ is expressed by $V_2 = \cos \theta$. Accordingly, in order to simplify the description, the output signals $V_1$, $V_2$ of the respective magnetic sensors 111, 112 are expressed by $V_1 = \sin \theta$ and $V_2 = \sin(\theta+90) = \cos \theta$, respectively.

The rotation angle θ of the rotor can be obtained on the basis of, for example, the following Expression (1) using the output signals $V_1$, $V_2$.

$$\begin{aligned}\theta &= \tan^{-1}(\sin\theta/\cos\theta) \\ &= \tan^{-1}(\sin\theta/\cos(\theta+90)) \\ &= \tan^{-1}(V_1/V_2)\end{aligned} \quad (1)$$

Japanese Patent Application Publication No. 2013-61346 (JP 2013-61346 A), Japanese Patent Application Publication No. 2010-101746 (JP 2010-101746 A), and Japanese Patent Application Publication No. 2007-322197 (JP 2007-322197 A) describe examples of the related art.

In the above-described rotation angle detecting device in the related art, when there is a failure in at least one of the magnetic sensors 111, 112, the rotation angle θ of the rotor 102 cannot be detected. Therefore, it is determined whether the magnetic sensors 111, 112 are normal on the basis of the following Expression (2), using the relation of $\sin^2 \theta + \cos^2 \theta = 1$ (relation of $V_1^2 + V_2^2 = 1$).

$$\text{lower limit} \leq V_1^2 + V_2^2 \leq \text{upper limit} \quad (2)$$

The lower limit is set to, for example, 0.9, and the upper limit is set to, for example, 1.1. When Expression (2) is satisfied, it is determined that the magnetic sensors 111, 112 are normal. When Expression (2) is not satisfied, it is determined that there is a failure in at least one of the magnetic sensors 111, 112.

In a case where the two magnetic sensors are disposed at an interval of an electrical angle other than 90 degrees, if the angular interval is not an interval of an electrical angle of 180 degrees, it is possible to detect the rotation angle of the rotating body on the basis of the output signals of the two magnetic sensors. In this case, it is not possible to determine whether the magnetic sensors are normal using Expression (2).

SUMMARY OF THE INVENTION

An object of the invention is to provide a rotation angle detecting device that can determine whether two magnetic sensors are normal even in a case where the two magnetic sensors are disposed at an interval of an electrical angle other than 90 degrees.

According to an aspect of the invention, there is provided a rotation angle detecting device including a first magnetic sensor that outputs a first sinusoidal signal ($V_1$) in accordance with rotation of a rotating body; and a second magnetic sensor that outputs a second sinusoidal signal ($V_2$) in accordance with the rotation of the rotating body. A phase difference (α) between the first sinusoidal signal ($V_1$) and the second sinusoidal signal ($V_2$) is an electrical angle other than 90 degrees and 180 degrees. The rotation angle detecting device further includes a device that computes a rotation angle (θ) of the rotating body based on the first sinusoidal signal ($V_1$) and the second sinusoidal signal ($V_2$), and a determination device that determines whether both the first and second magnetic sensors are normal, or there is a failure in at least one of the first and second magnetic sensors, based on the first sinusoidal signal ($V_1$), the second sinusoidal signal ($V_2$), and the phase difference (α). The determination device is configured to determine that both the first and second magnetic sensors are normal when an expression (a) is satisfied, and to determine that there is a failure in at least one of the first and second magnetic sensors when the expression (a) is not satisfied, the expression (a) being $$L \leq X_{12} \leq U$$

$$X_{12} = V_1^2 + V_2^2 - 2[1 - 2\sin^2(\alpha/2)]V_1 \cdot V_2 - 1 + \{1 - 2\sin^2(\alpha/2)\}^2, \quad (a)$$

where L is a lower limit that is set in advance and that is smaller than 0, and U is an upper limit set in advance and that is larger than 0.

With the rotation angle detecting device according to the above-described aspect, even in the case where the two magnetic sensors are disposed at an interval of an electrical angle other than 90 degrees, it is possible to determine whether the magnetic sensors are normal.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
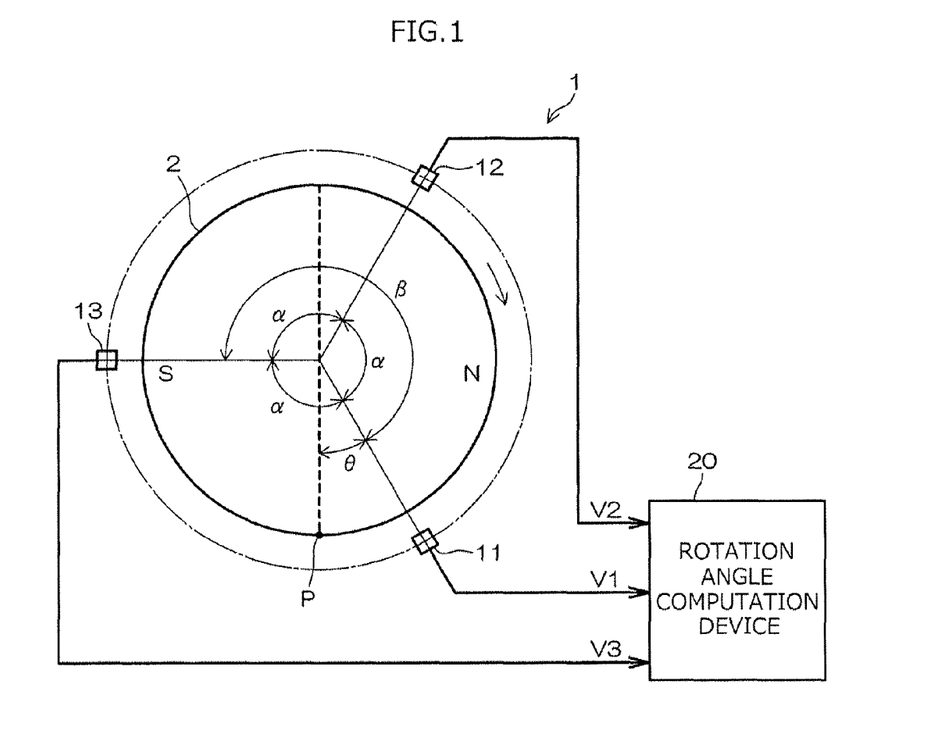
FIG. 1 is a schematic diagram illustrating a configuration of a rotation angle detecting device according to an embodiment of the invention.

Hereinafter, embodiments in a case where the invention is applied to a rotation angle detecting device for detecting a rotation angle of a rotor of a brushless motor will be described in detail with reference to the accompanying drawings. FIG. 1 is a schematic diagram illustrating the configuration of a rotation angle detecting device according to an embodiment of the invention. A rotation angle detecting device 1 can be used to detect a rotation angle of a rotor of a brushless motor of an electric power steering system. For example, the rotation angle detecting device 1 includes a detection rotor 2 (hereinafter, referred to as a rotor 2) that rotates in accordance with the rotation of the brushless motor. The rotor 2 includes a magnet having two magnetic poles N, S (a pair of magnetic poles).

Three magnetic sensors 11, 12, 13 are disposed at intervals in a circumferential direction of the rotor 2, in the vicinity of the rotor 2. The three magnetic sensors 11, 12, 13 may be referred to as a first magnetic sensor 11, a second magnetic sensor 12, and a third magnetic sensor 13, respectively. For example, a sensor, which includes an element having electrical characteristics changing due to the action of a magnetic field, for example, a Hall element or a magnetoresistive element, can be used as the magnetic sensor.

The three magnetic sensors 11, 12, 13 are disposed on a concentric circle around the central axis of the rotor 2. In this embodiment, when an angular interval between two adjacent magnetic sensors is represented by an electrical angle, the three magnetic sensors 11, 12, 13 are disposed at equal angular intervals. The first magnetic sensor 11 and the second magnetic sensor 12 are disposed at an angular interval of α (electrical angle) degrees around the rotation center axis of the rotor 2. The first magnetic sensor 11 and the third magnetic sensor 13 are disposed at an angular interval of β (electrical angle) degrees larger than α degrees around the rotation center axis of the rotor 2. In this embodiment, α is set to 120 degrees, and β is set to 240 degrees. In this embodiment, the angular interval α between the second magnetic sensor 12 and the third magnetic sensor 13 and the angular interval α between the third magnetic sensor 13 and the first magnetic sensor 11 are both 120 degrees.

An angular interval θ between a reference position P of the rotor 2 shown in FIG. 1 and the first magnetic sensor 11 is defined as a rotation angle of the rotor 2. A direction of an arrow shown in FIG. 1 is a forward direction. When the rotor 2 rotates in the forward direction, the rotor rotation angle θ increases. When the rotor 2 rotates in a reverse direction, the rotor rotation angle θ decreases. An output signal $V_1$ ($V_1 = \phi 1 \cdot \sin \theta$) is output from the first magnetic sensor 11. An output signal $V_2$ ($V_2 = \phi 2 \cdot \sin(\theta+\alpha) = \phi 2 \cdot \sin(\theta+120)$) is output from the second magnetic sensor 12. An output signal $V_3$ ($V_3 = \phi 3 \cdot \sin(\theta+\beta) = \phi 3 \cdot \sin(\theta+240)$) is output from the third magnetic sensor 13. Each of $\phi 1$, $\phi 2$, and $\phi 3$ denotes an amplitude.

When the amplitudes $\phi 1$, $\phi 2$, and $\phi 3$ are regarded as the same value $\phi$ or when the signals $V_1$, $V_2$, $V_3$ are normalized so that each of the amplitudes is a predetermined specified value $\phi$, the signals $V_1$, $V_2$, $V_3$ are expressed by $\phi \cdot \sin \theta$, $\phi \cdot \sin(\theta+\alpha)$, and $\phi \cdot \sin(\theta+\beta)$, respectively. When $\phi$ is 1 ($\phi=1$), the signals $V_1$, $V_2$, $V_3$ are expressed by $\sin \theta$, $\sin(\theta+\alpha)$, and $\sin(\theta+\beta)$, respectively. Consequently, in the following description, the output signals $V_1$, $V_2$, $V_3$ of the magnetic sensors 11, 12, 13 are expressed by $V_1 = \sin \theta$, $V_2 = \sin(\theta+\alpha) = \sin(\theta+120)$, and $V_3 = \sin(\theta+\beta) = \sin(\theta+240)$, respectively.

Figure 2:
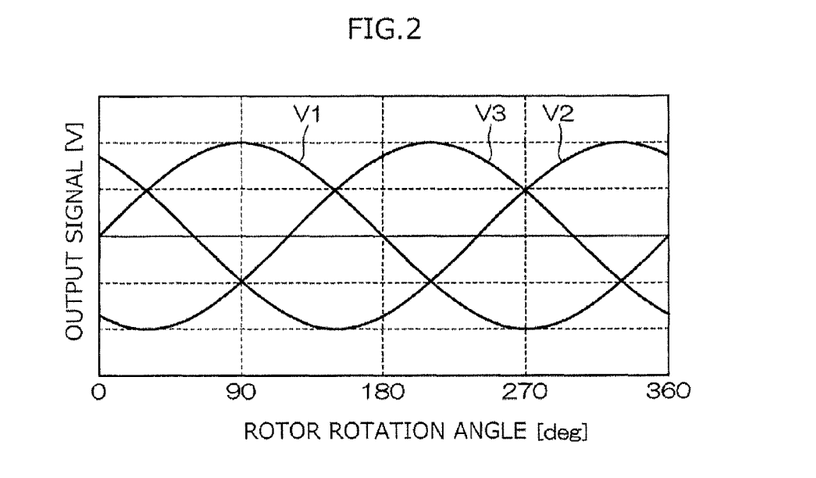
FIG. 2 is a schematic diagram illustrating waveforms of output signals of a first magnetic sensor, a second magnetic sensor, and a third magnetic sensor.

FIG. 2 shows waveforms of the respective output signals $V_1$, $V_2$, $V_3$ of the magnetic sensors 11, 12, 13. Hereinafter, the output signal $V_1$ may be referred to as a first output signal, the output signal $V_2$ may be referred to as a second output signal, and the output signal $V_3$ may be referred to as a third output signal. In this embodiment, a phase difference between the first output signal $V_1$ and the second output signal $V_2$, a phase difference between the second output signal $V_2$ and the third output signal $V_3$, and a phase difference between the third output signal $V_3$ and the first output signal $V_3$ are all 120 degrees. In other words, in this embodiment, an angular interval between the two adjacent magnetic sensors is set so that a phase difference between the respective output signals of the two adjacent magnetic sensors is 120 (=360/a total number of magnetic sensors) degrees.

The respective output signals $V_1$, $V_2$, $V_3$ of the magnetic sensors 11, 12, 13 are input to a rotation angle computation device 20. The rotation angle computation device 20 computes the rotation angle θ of the rotor 2 on the basis of the respective output signals $V_1$, $V_2$, $V_3$ of the magnetic sensors 11, 12, 13. The rotation angle computation device 20 is constituted by, for example, a microcomputer, and includes a CPU and memory (ROM, RAM, and the like). The rotation angle computation device 20 has a function of detecting a failure in the magnetic sensors 11, 12, 13 and a function of computing the rotation angle θ of the rotor 2 on the basis of output signals of two normal magnetic sensors.

Figure 3:
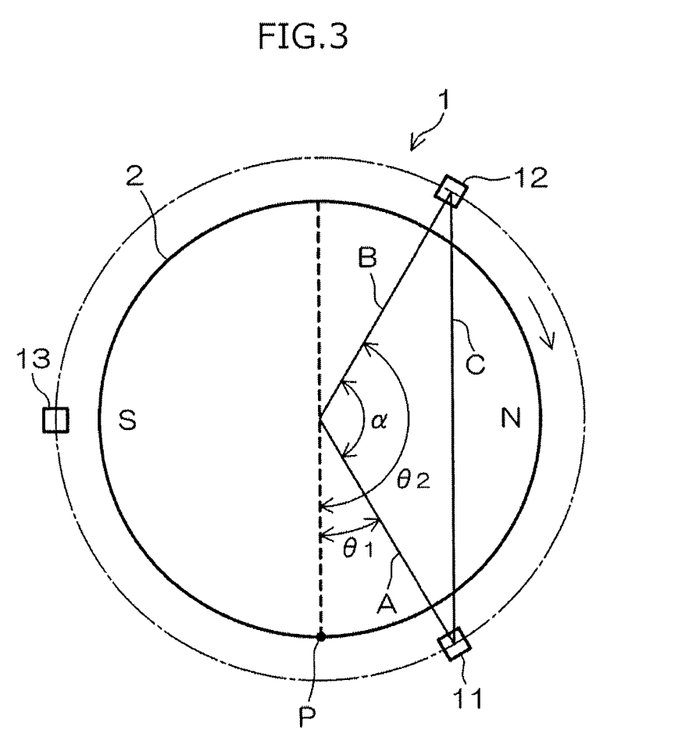
FIG. 3 is a schematic diagram for explaining a basic concept of a failure detection method for magnetic sensors.

The function of detecting a failure in the magnetic sensors will be described with reference to FIG. 3. The rotation angle computation device 20 has a function of determining whether the magnetic sensors are normal on the basis of the output signals of the two adjacent magnetic sensors. A description will be made on a case where it is determined whether the first and second magnetic sensors 11, 12 are normal, on the basis of the output signal $V_1$ of the first magnetic sensor 11 and the output signal $V_2$ of the second magnetic sensor 12.

A length of a straight line connecting the rotation center axis of the rotor 2 and the first magnetic sensor 11 is represented by A, a length of a straight line connecting the rotation center axis of the rotor 2 and the second magnetic sensor 12 is represented by B, and a length of a straight line connecting the first magnetic sensor 11 and the second magnetic sensor 12 is represented by C. When an angular interval between the reference position P for the rotation angle of the rotor 2 and the first magnetic sensor 11 is set to $\theta_1$ (equivalent to the rotor rotation angle $\theta$ in this embodiment) and an angular interval between the reference position P for the rotation angle of the rotor 2 and the second magnetic sensor 12 is set to $\theta_2$, the expressions of $V_1=\sin\theta_1$ and $V_2=\sin\theta_2=\sin(\theta_1+\alpha)$ are established.

The following Expression (3) is established based on the cosine theorem.

$$A^2+B^2 2AB\cos(\theta_2-\theta_1)=C^2 \quad (3)$$

Since the magnetic sensors 11, 12 are disposed on the concentric circle around the central axis of the rotor 2, the expression of A=B is established. In addition, since a triangle having straight lines A, B, C as the three sides thereof is an isosceles triangle, the expression of $C=2A\sin(\alpha/2)$ is established.

By substituting A=B and $C=2A\sin(\alpha/2)$ into Expression (3), the following Expression (4) is obtained.

$$(\cos\theta_2\cos\theta_1+\sin\theta_2\sin\theta_1)=1-2\sin^2(\alpha/2) \quad (4)$$

By transforming Expression (4), the following Expression (5) is obtained.

$$\cos\theta_2\cos\theta_1=\{1-2\sin^2(\alpha/2)\}-\sin\theta_2\sin\theta_1 \quad (5)$$

By squaring both sides of Expression (5), the following Expression (6) is obtained.

$$(\cos\theta_2\cos\theta_1)^2 = \{1-2\sin^2(\alpha/2)\}^2 - 2\{1-2\sin^2(\alpha/2)\}\sin\theta_2\sin\theta_1 + (\cos\theta_2\cos\theta_1)^2 \quad (6)$$

By substituting $\cos^2\theta_1=1-\sin^2\theta_1$ and $\cos^2\theta_2=1-\sin^2\theta_2$ into Expression (6), the following Expression (7) is obtained.

$$\sin\theta_1^2+\sin\theta_2^2-2\{1-2\sin^2(\alpha/2)\}\sin\theta_1\sin\theta_2=1-\{1-2\sin^2(\alpha/2)\}^2 \quad (7)$$

By substituting $\sin\theta_1=V_1$ and $\sin\theta_2=V_2$ into Expression (7), the following Expression (8) is obtained.

$$V_1^2+V_2^2-2\{1-2\sin^2(\alpha/2)\}V_1\cdot V_2=1-\{1-2\sin^2(\alpha/2)\}^2 \quad (8)$$

Consequently, when a lower limit, which is set in advance, is represented by L (L<0) and an upper limit, which is set in advance, is represented by U (U>0), it is possible to determine whether the magnetic sensors 11, 12 are normal, on the basis of the following Expression (9).

$$L \leq X_{12} \leq U$$

$$X_{12}=V_1^2+V_2^2-2\{1-2\sin^2(\alpha/2)\}V_1\cdot V_2-1+\{1-2\sin^2(\alpha/2)\}^2 \quad (9)$$

When Expression (9) is satisfied, it is determined whether the magnetic sensors 11, 12 are normal. On the other hand, when Expression (9) is not satisfied, it is determined that there is a failure in at least one of the magnetic sensors 11, 12.

When it is determined whether the second and third magnetic sensors 12, 13 are normal on the basis of the output signal $V_2$ of the second magnetic sensor 12 and the output signal $V_3$ of the third magnetic sensor 13, it is possible to determine whether the magnetic sensors 12, 13 are normal on the basis of the following Expression (10).

$$L \leq X_{23} \leq U$$

$$X_{23}=V_2^2+V_3^2-2\{1-2\sin^2(\alpha/2)\}V_2\cdot V_3-1+\{1-2\sin^2(\alpha/2)\}^2 \quad (10)$$

When it is determined whether the first and third magnetic sensors 11, 13 are normal on the basis of the output signal $V_1$ of the first magnetic sensor 11 and the output signal $V_3$ of the third magnetic sensor 13, it is possible to determine whether the magnetic sensors 11, 13 are normal on the basis of the following Expression (11).

$$L \leq X_{31} \leq U$$

$$X_{31}=V_3^2+V_1^2-2\{1-2\sin^2(\alpha/2)\}V_3\cdot V_1 1+\{1-2\sin^2(\alpha/2)\}^2 \quad (11)$$

In this embodiment, since $\alpha$ is 120 degrees, $X_{12}, X_{23}, X_{31}$ in Expressions (9), (10), (11) are expressed by the following Expressions (12), (13), (14), respectively.

$$X_{12}=V_1^2+V_2^2+V_1\cdot V_2-0.75 \quad (12)$$

$$X_{23}=V_2^2+V_3^2+V_2\cdot V_3-0.75 \quad (13)$$

$$X_{31}=V_3^2+V_1^2+V_3\cdot V_1-0.75 \quad (14)$$

In this case, the lower limit U and the upper limit L are expressed by, for example, the following Expressions (15), (16).

$$L=-0.75\times(\gamma/100) \quad (15)$$

$$U=0.75\times(\gamma/100) \quad (16)$$

In Expressions (15), (16), $\gamma$ denotes a value set in advance, and $\gamma$ is set to, for example, 5.

A description will be made on a failure determination method in a case where N magnetic sensors are disposed at intervals on a concentric circle and an angular interval between the adjacent magnetic sensors is set so that a phase difference between output signals of the two adjacent magnetic sensors is 360/N degrees, N being a number equal to or larger than three. In this case, when an output signal of one magnetic sensor of the two adjacent magnetic sensors is represented by Va, an output signal of the other magnetic sensor is represented by Vb, a lower limit, which is set in advance, is represented by L (L<0), and an upper limit, which is set in advance, is represented by U (U>0), it is possible to determine whether the two adjacent magnetic sensors are normal on the basis of the following Expression (17).

$$L \leq Xab \leq U$$

$$Xab=Va^2+Vb^2-2\{1-2\sin^2(180/N)\}Va\cdot Vb-1+\{1-2\sin^2(180/N)\}^2 \quad (17)$$

Next, the function of computing a rotor rotation angle will be described. The rotation angle computation device 20 has a function of computing the rotor rotation angle $\theta$ on the basis of the first output signal $V_1$ and the second output signal $V_2$, a function of computing the rotor rotation angle $\theta$ on the basis of the first output signal $V_1$ and the third output signal $V_3$, and a function of computing the rotor rotation angle $\theta$ on the basis of the second output signal $V_2$ and the third output signal $V_3$.

The function of computing the rotor rotation angle $\theta$ on the basis of the first output signal $V_1$ and the second output signal $V_2$ will be described below. As described above, the expressions of $V_1 = \sin\theta$ and $V_2 = \sin(\theta+\alpha)$ are established. Here, $\sin(\theta+\alpha)$ can be expanded as shown in the following Expression (18), based on the addition theorem.

$$\sin(\theta+\alpha) = \sin\theta\cdot\cos\alpha + \cos\theta\cdot\sin\alpha \quad (18)$$

It is possible to obtain the following Expression (19) using Expression (18).

$$\cos\theta = \{\sin(\theta+\alpha) - \sin\theta\cdot\cos\alpha\}/\sin\alpha \quad (19)$$
$$= (V_2 - V_1\cdot\cos\alpha)/\sin\alpha$$

The rotor rotation angle $\theta$ can be computed on the basis of the following Expression (20).

$$\theta = \tan^{-1}(\sin\theta/\cos\theta) \quad (20)$$
$$= \tan^{-1}\{V_1\cdot\sin\alpha/(V_2 - V_1\cdot\cos\alpha)\}$$

In this embodiment, $\alpha$ is 120 degrees ($\alpha=120$ degrees).

The function of computing the rotor rotation angle $\theta$ on the basis of the first output signal $V_1$ and the third output signal $V_3$ will be described below. As described above, the expressions of $V_1 = \sin\theta$ and $V_3 = \sin(\theta+\beta)$ are established. Here, $\sin(\theta+\beta)$ can be expanded as shown in the following Expression (21), based on the addition theorem.

$$\sin(\theta+\beta) = \sin\theta\cdot\cos\beta + \cos\theta\cdot\sin\beta \quad (21)$$

It is possible to obtain the following Expression (22) using Expression (21).

$$\cos\theta = \{\sin(\theta+\beta) - \sin\theta\cdot\cos\beta\}/\sin\beta \quad (22)$$
$$= \{V_3 - V_1\cdot\cos\beta\}/\sin\beta$$

The rotor rotation angle $\theta$ can be computed on the basis of the following Expression (23).

$$\theta = \tan^{-1}(\sin\theta/\cos\theta) \quad (23)$$
$$= \tan^{-1}\{V_1\cdot\sin\beta/(V_3 - V_1\cdot\cos\beta)\}$$

In this embodiment, $\beta$ is 240 degrees ($\beta=240$ degrees).

The function of computing the rotor rotation angle $\theta$ on the basis of the second output signal $V_2$ and the third output signal $V_3$ will be described below. When the expression of $\Theta = (\theta+\alpha)$ is established, $V_2$ is represented by the expression of $V_2 = \sin\Theta$ and $V_3$ is represented by the expression of $V_3 = \sin(\Theta+\alpha)$. Here, $\sin(\Theta+\alpha)$ can be expanded as shown in the following Expression (24), based on the addition theorem.

$$\sin(\Theta+\alpha) = \sin\Theta\cdot\cos\alpha + \cos\Theta\cdot\sin\alpha \quad (24)$$

It is possible to obtain the following Expression (25) using Expression (24).

$$\cos\Theta = \{\sin(\Theta+\alpha) - \sin\Theta\cdot\cos\alpha\}/\sin\alpha \quad (25)$$
$$= (V_3 - V_2\cdot\cos\alpha)/\sin\alpha$$

The rotor rotation angle $\theta$ can be computed on the basis of the following Expression (26).

$$\theta = \Theta - \alpha \quad (26)$$
$$= \{\tan^{-1}(\sin\Theta/\cos\Theta)\} - \alpha$$
$$= [\tan^{-1}\{V_2\cdot\sin\alpha/(V_3 - V_2\cdot\cos\alpha)\}] - \alpha$$

In this embodiment, $\alpha$ is 120 degrees ($\alpha=120$ degrees).

Figure 4A:
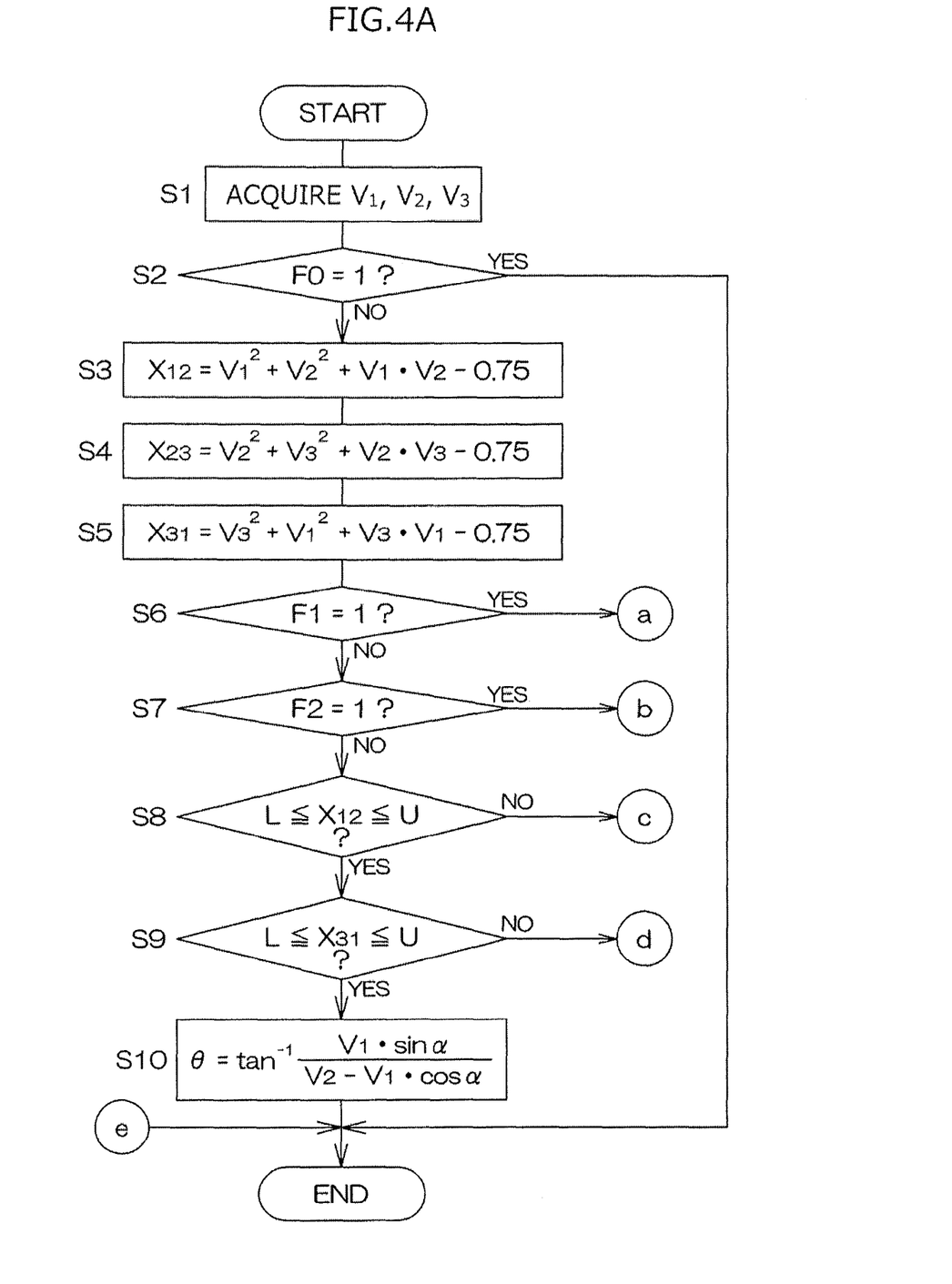
FIG. 4A is a flowchart for explaining an example of an operation of a rotation angle computation device.
Figure 4B:
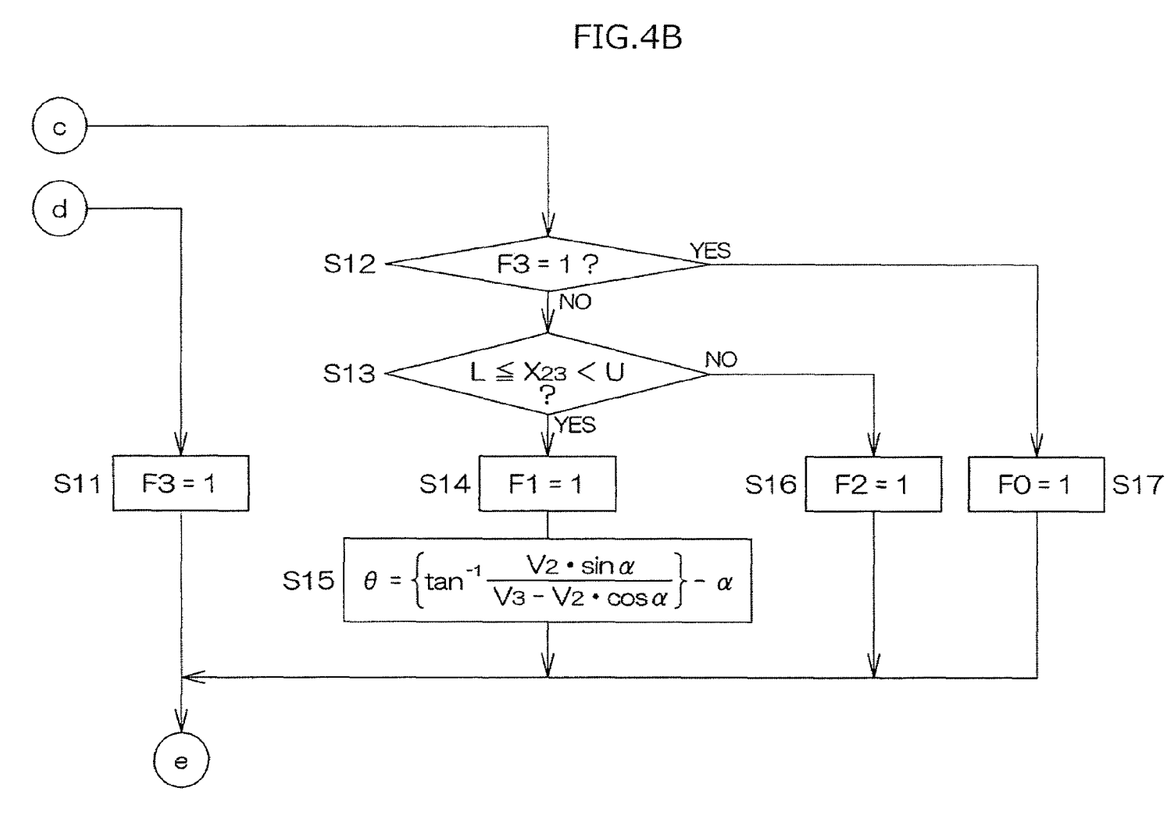
FIG. 4B is a flowchart for explaining the example of the operation of the rotation angle computation device.
Figure 4C:
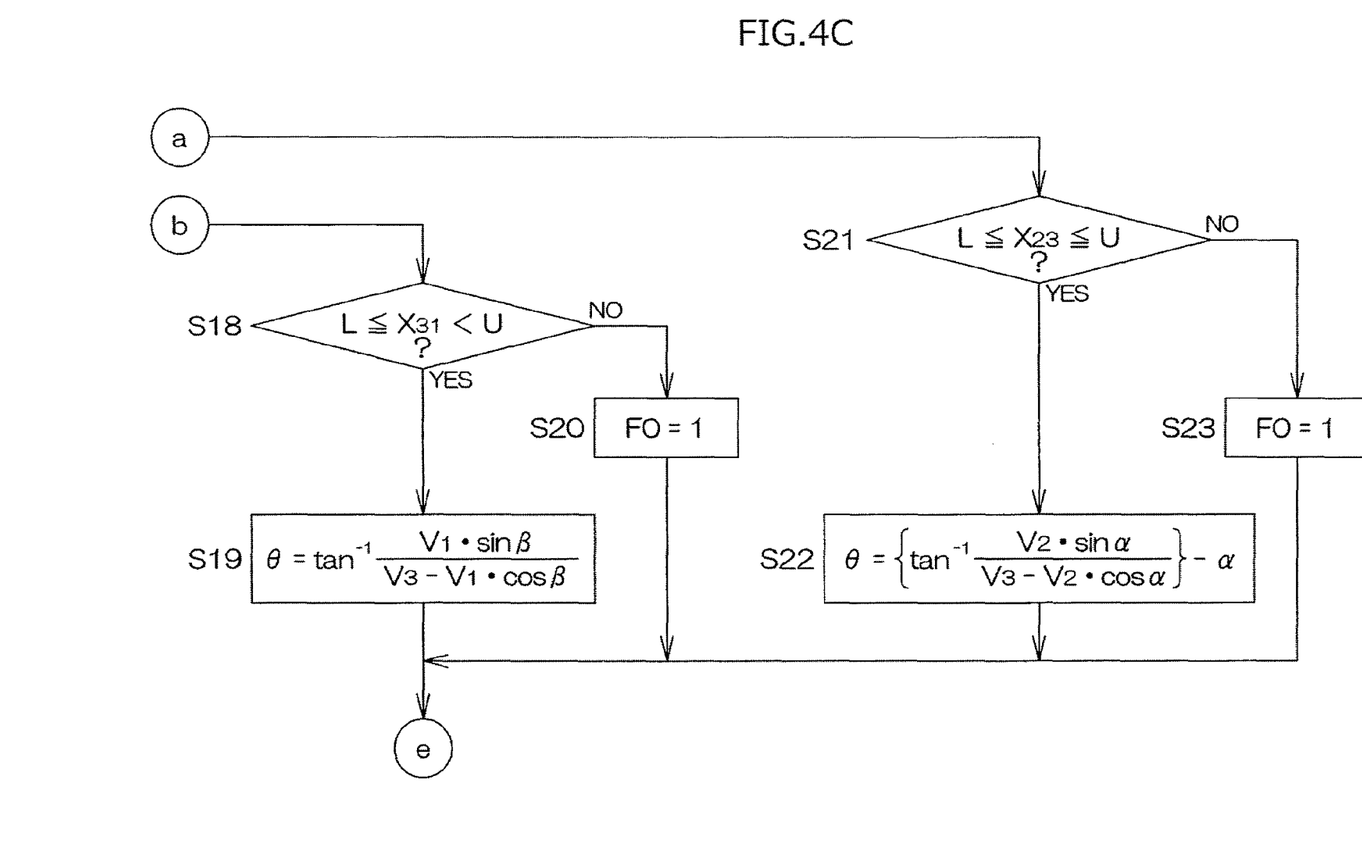
FIG. 4C is a flowchart for explaining the example of the operation of the rotation angle computation device.

FIG. 4A, FIG. 4B, and FIG. 4C are flowcharts illustrating an example of an operation of the rotation angle computation device 20. Processes shown in FIG. 4A, FIG. 4B, and FIG. 4C are repeatedly executed in each predetermined computation cycle. First, flags used by the rotation angle computation device 20 will be described. A rotation angle incomputable flag F0 is a flag for storing a determination result that there is a failure in each of two or more magnetic sensors among the three magnetic sensors 11, 12, 13, and is set (F0=1) when it is determined that there is a failure in each of the two or more magnetic sensors.

A first failure flag F1 is a flag for storing a determination result that there is a failure in the first magnetic sensor 11, and is set (F1=1) when it is determined that there is a failure in the first magnetic sensor 11. A second failure flag F2 is a flag for storing a determination result that there is a failure in the second magnetic sensor 12, and is set (F2=1) when it is determined that there is a failure in the second magnetic sensor 12. A third failure flag F3 is a flag for storing a determination result that there is a failure in the third magnetic sensor 13, and is set (F3=1) when it is determined that there is a failure in the third magnetic sensor 13. When a power source for the rotation angle computation device 20 is turned on, all the flags F0, F1, F2, F3 are reset (F0=F1=F2=F3=0).

Referring to FIG. 4A, first, the rotation angle computation device 20 acquires the respective output signals $V_1$, $V_2$, $V_3$ of the magnetic sensors 11, 12, 13 (step S1). Then, the rotation angle computation device 20 determines whether the rotation angle incomputable flag F0 is in a set state (F0=1) (step S2). When the rotation angle incomputable flag F0 is in a reset state (F0=0) (step S2: NO), the rotation angle computation device 20 computes $X_{12}$, $X_{23}$, and $X_{31}$ on the basis of Expressions (12), (13), (14) (step S3, S4, S5).

The rotation angle computation device 20 determines whether the first failure flag F1 is in a set state (step S6). When the first failure flag F1 is in a reset state (F1=0) (step S6: NO), the rotation angle computation device 20 determines whether the second failure flag F2 is in a set state (step S7). When the second failure flag F2 is in a reset state (F2=0) (step S7: NO), the rotation angle computation device 20 determines whether $X_{12}$ computed in step S3 satisfies the condition of $L \le X_{12} \le U$ (step S8).

When the condition of $L \le X_{12} \le U$ is satisfied (step S8: YES), the rotation angle computation device 20 determines that the first and second magnetic sensors 11, 12 are normal, and determines whether $X_{31}$ computed in step S5 satisfies the condition of $L \le X_{31} \le U$ (step S9). When the condition of $L \le X_{31} \le U$ is satisfied (step S9: YES), the rotation angle computation device 20 determines that the first and third magnetic sensors 11, 13 are normal and proceeds to step S10. In step S10, the rotation angle computation device 20 computes the rotation angle $\theta$ on the basis of Expression (20), using the first output signal $V_1$ and the second output signal $V_2$. Then, the rotation angle computation device 20 terminates the processing in the present computation cycle.

In step S10, the rotation angle computation device 20 may compute the rotation angle θ on the basis of Expression (23) or Expression (26).

When it is determined that the condition of $L \leq X_{31} \leq U$ is not satisfied in step S9 (step S9: NO), the rotation angle computation device 20 determines that there is a failure in the third magnetic sensor 13 as shown in FIG. 4B, and sets the third failure flag F3 (F3=1) (step S11). Then, the rotation angle computation device 20 terminates the processing in the present computation cycle. When it is determined that the condition of $L \leq X_{12} \leq U$ is not satisfied in step S8 (see FIG. 4A) (step S8: NO), the rotation angle computation device 20 determines whether the third failure flag F3 is in a set state (F3=1) (step S12), as shown in FIG. 4B. When the third failure flag F3 is in a reset state (F3=0) (step S12: NO), the rotation angle computation device 20 determines whether $X_{23}$ computed in step S4 satisfies the condition of $L \leq X_{23} \leq U$ (step S13).

When the condition of $L \leq X_{23} \leq U$ is satisfied (step S13: YES), the rotation angle computation device 20 determines that there is a failure in the first magnetic sensor 11, and sets the first failure flag F1 (F1=1) (step S14). The rotation angle computation device 20 computes the rotation angle θ on the basis of Expression (26), using the second output signal $V_2$ and the third output signal $V_3$ (step S15). Then, the rotation angle computation device 20 terminates the processing in the present computation cycle.

When it is determined that the condition of $L \leq X_{23} \leq U$ is not satisfied in step S13 (step S13: NO), the rotation angle computation device 20 determines that there is a failure in the second magnetic sensor 12, and sets the second failure flag F2 (F2=1) (step S16). Then, the rotation angle computation device 20 terminates the processing in the present computation cycle. When it is determined that the third failure flag F3 is in the set state (F3=1) in step S12 (step S12: YES), the rotation angle computation device 20 determines that there is a failure in each of two or more magnetic sensors, and sets the rotation angle incomputable flag F0 (F0=1) (step S17). Then, the rotation angle computation device 20 terminates the processing in the present computation cycle.

When it is determined that the second failure flag F2 is in the set state (F2=1) in step S7 (see FIG. 4A) (step S7: YES), the rotation angle computation device 20 determines whether $X_{31}$ computed in step S5 satisfies the condition of $L \leq X_{31} \leq U$ (step S18), as shown in FIG. 4C (step S18). When the condition of $L \leq X_{31} \leq U$ is satisfied (step S18: YES), the rotation angle computation device 20 computes the rotation angle θ on the basis of Expression (23), using the first output signal $V_1$ and the third output signal $V_3$ (step S19). Then, the rotation angle computation device 20 terminates the processing in the present computation cycle.

When it is determined that the condition of $L \leq X_{31} \leq U$ is not satisfied in step S18 (step S18: NO), the rotation angle computation device 20 determines that there is a failure in each of two or more magnetic sensors, and sets the rotation angle incomputable flag F0 (F0=1) (step S20). Then, the rotation angle computation device 20 terminates the processing in the present computation cycle. When it is determined that the first failure flag F1 is in the set state (F1=1) in step S6 (see FIG. 4A) (step S6: YES), the rotation angle computation device 20 determines whether $X_{23}$ computed in step S4 satisfies the condition of $L \leq X_{23} \leq U$ (step S21), as shown in FIG. 4C. When the condition of $L \leq X_{23} \leq U$ is satisfied (step S21: YES), the rotation angle computation device 20 computes the rotation angle θ on the basis of Expression (26), using the second output signal $V_2$ and the third output signal $V_3$ (step S22). Then, the rotation angle computation device 20 terminates the processing in the present computation cycle.

When it is determined that the condition of $L \leq X_{23} \leq U$ is not satisfied in step S21 (step S21: NO), the rotation angle computation device 20 determines that there is a failure in each of two or more magnetic sensors, and sets the rotation angle incomputable flag F0 (F0=1) (step S23). Then, the rotation angle computation device 20 terminates the processing in the present computation cycle. When it is determined that the rotation angle incomputable flag F0 is in the set state (F0=1) in step S2 (see FIG. 4A) (step S2: YES), the rotation angle computation device 20 terminates the processing in the present computation cycle.

In the above-described embodiment, even in the case where the angular interval between the two adjacent magnetic sensors is an interval of an electrical angle other than 90 degrees, it is possible to determine whether the two magnetic sensors are normal, or there is a failure in at least one of the magnetic sensors. In the above-described embodiment, even when there is a failure in any one of the three magnetic sensors 11, 12, 13, it is possible to compute the rotation angle θ of the rotor 2 on the basis of output signals of two other normal magnetic sensors.

Although the embodiment of the invention has been described, the invention can also be implemented in other embodiments. In the above-described embodiment, the angular interval between the adjacent magnetic sensors is an interval of an electrical angle of 120 degrees. However, the angular interval may be an interval of an electrical angle other than 120 degrees as long as the angular interval is an interval of an electrical angle other than 90 degrees and 180 degrees. In addition, all angular intervals between adjacent magnetic sensors may not be the same. In the above-described embodiment, three magnetic sensors may be provided. However, two magnetic sensors may be provided, or four or more magnetic sensors may be provided.

In the above-described embodiment, the first, second, and third output signals $V_1$, $V_2$, $V_3$ are expressed by $\sin \theta$, $\sin(\theta+\alpha)$, and $\sin(\theta+\beta)$, respectively. However, even when the first, second, and third output signals $V_1$, $V_2$, $V_3$ are expressed by $\cos \theta$, $\cos(\theta+\alpha)$, and $\cos(\theta+\beta)$, the invention can be applied. In the above-described embodiment, a pair of magnetic poles is provided in the rotor 2. However, two or more pairs of magnetic poles may be provided in the rotor 2.

The invention can also be applied to a case where a rotation angle of a rotating body other than a rotor of a brushless motor is detected.

What is claimed is:

1. A rotation angle detecting device comprising:
   a first magnetic sensor that outputs a first sinusoidal signal ($V_1$) in accordance with rotation of a rotating body; and
   a second magnetic sensor that outputs a second sinusoidal signal ($V_2$) in accordance with the rotation of the rotating body,
   wherein a phase difference (α) between the first sinusoidal signal ($V_1$) and the second sinusoidal signal ($V_2$) is an electrical angle other than 90 degrees and 180 degrees,
   wherein the rotation angle detecting device further includes
   a device that computes a rotation angle (θ) of the rotating body based on the first sinusoidal signal ($V_1$) and the second sinusoidal signal ($V_2$), and
   a determination device that determines whether both the first and second magnetic sensors are operating normally, or there is a failure in at least one of the first and second magnetic sensors, based on the first sinusoidal signal ($V_1$), the second sinusoidal signal ($V_2$), and the phase difference ($\alpha$), and wherein the determination device is configured to determine that both the first and second magnetic sensors are operating normally when an expression (a) is satisfied, and to determine that there is the failure in at least one of the first and second magnetic sensors when the expression (a) is not satisfied, the expression (a) being $$L \leq X_{12} \leq U$$

$$X_{12} = V_1^2 + V_2^2 - 2[1-2\sin^2(\alpha/2)]V_1 \cdot V_2 - 1 + \{1-2\sin^2(\alpha/2)\}^2, \quad (a)$$

where L is a lower limit that is set in advance and that is smaller than 0, and U is an upper limit set in advance and that is larger than 0.

2. The rotation angle detecting device according to claim 1, wherein the phase difference ($\alpha$) is an electrical angle of 120 degrees.

3. The rotation angle detecting device according to claim 1, further comprising a third magnetic sensor that outputs a third sinusoidal signal ($V_3$) in accordance with the rotation of the rotating body.

4. The rotation angle detecting device according to claim 3, wherein a phase difference ($\beta$) between the third sinusoidal signal ($V_3$) and the first sinusoidal signal ($V_1$) is an electric angle of 240 degrees.

5. The rotation angle detecting device according to claim 3, wherein the rotation angle computation device computes the rotation angle $\theta$ on the basis of at least two of the respective output signals $V_1$, $V_2$, $V_3$ of the magnetic sensors.

6. The rotation angle detecting device according to claim 3, wherein each of the first magnetic sensor, second magnetic sensor, and third magnetic sensor are disposed on a concentric circle around a central axis of rotation of the rotating body.

7. A rotation angle detecting system comprising:
at least three magnetic sensors each outputting a sinusoidal signal in accordance with rotation of a rotating body, each of the sensors disposed on a concentric circle around a central axis of rotation of the rotating body and positioned so that a phase difference between the respective output signals of two adjacent magnetic sensors is an electric angle other than 90 degrees and 180 degrees;

a device that computes a rotation angle ($\theta$) of the rotating body based on at least two of the respective sinusoidal signals of the magnetic sensors; and a determination device that determines whether the magnetic sensors are operating normally, or there is a failure in at least one of the magnetic sensors, by (i) analyzing the sinusoidal signals of a first pair of adjacent magnetic sensors; and (ii) analyzing the sinusoidal signals of a second pair of adjacent magnetic sensors, wherein the determination device is configured to determine that the first pair of magnetic sensors are operating normally by (i) calculating a value based on the sinusoidal signals and the phase difference of the first pair of sensors; and (ii) comparing the value to a predetermined threshold value, and wherein the value can be represented by $X_{12}$, which is calculated according to the following equation:

$$X_{12} = V_1^2 + V_2^2 - 2[1-2\sin^2(\alpha/2)]V_1 \cdot V_2 - 1 + \{1-2\sin^2(\alpha/2)\}^2$$

where $V_1$ is the sinusoidal signal of one of the sensors of the first pair and $V_2$ is the sinusoidal signal of the other of the sensors of the first pair.

* * * * *